(12) United States Patent
Wernersson

(10) Patent No.: US 9,170,723 B2
(45) Date of Patent: Oct. 27, 2015

(54) METHOD, GRAPHICAL USER INTERFACE, AND COMPUTER PROGRAM PRODUCT FOR PROCESSING OF A LIGHT FIELD IMAGE

(75) Inventor: Mats Wernersson, Helsingborg (SE)

(73) Assignee: SONY ERICSSON MOBILE COMMUNICATIONS AB, Lund (SE)

( * ) Notice: Subject to any disclaimer, the term of this patent is extended or adjusted under 35 U.S.C. 154(b) by 0 days.

(21) Appl. No.: 13/514,135

(22) PCT Filed: May 4, 2011

(86) PCT No.: PCT/EP2011/057159
§ 371 (c)(1),
(2), (4) Date: Jun. 6, 2012

(87) PCT Pub. No.: WO2012/149971
PCT Pub. Date: Nov. 8, 2012

(65) Prior Publication Data
US 2014/0059462 A1    Feb. 27, 2014

(51) Int. Cl.
*G06F 3/048* (2013.01)
*G06T 15/20* (2011.01)
*G06F 3/0484* (2013.01)
*G06T 5/50* (2006.01)
*G06F 3/042* (2006.01)

(52) U.S. Cl.
CPC .......... *G06F 3/04847* (2013.01); *G06F 3/0425* (2013.01); *G06T 5/50* (2013.01); *G06T 2200/21* (2013.01); *G06T 2207/10052* (2013.01)

(58) Field of Classification Search
CPC ........... G06T 3/00; G06T 11/00; G06T 15/20; H04N 5/225; H04N 9/646
See application file for complete search history.

(56) References Cited

U.S. PATENT DOCUMENTS

| | | | |
|---|---|---|---|
| 8,625,897 B2* | 1/2014 | Criminisi et al. | 382/173 |
| 2004/0062439 A1* | 4/2004 | Cahill et al. | 382/173 |
| 2008/0131019 A1 | 6/2008 | Ng | |
| 2008/0246777 A1* | 10/2008 | Swanson et al. | 345/640 |
| 2010/0045799 A1* | 2/2010 | Lei et al. | 348/169 |
| 2010/0238266 A1* | 9/2010 | Jojic et al. | 348/36 |

OTHER PUBLICATIONS

Levoy et al., "Light Field Rendering", Computer Graphics Proceedings, pp. 31-42 (Aug. 4, 1996).
Seitz et al., "Plenoptic Image Editing", International Journal of Computer Vision, vol. 48, No. 2, pp. 115-129 (2002).
Zokai et al., "Multiview Paraperspective Projection Model for Diminished Reality", Proceedings of the Second IEEE and ACM International Symposium on Mixed and Augmented Reality, pp. 217-226 (Oct. 7, 2003).
International Preliminary Report on Patentability and Written Opinion for International Application No. PCT/EP2011/057159 (Nov. 5, 2013).

* cited by examiner

*Primary Examiner* — Tadeese Hailu
(74) *Attorney, Agent, or Firm* — Locke Lord LLP; Jeffrey D. Hsi

(57) ABSTRACT

A method and a graphical user interface for processing of an object in light field data is provided. The method and graphical user interface may be used to remove an object or obstruction blocking another object or background of a captured scene. The method and graphical user interface may also be used for high precision edge detection in a light field image.

3 Claims, 9 Drawing Sheets

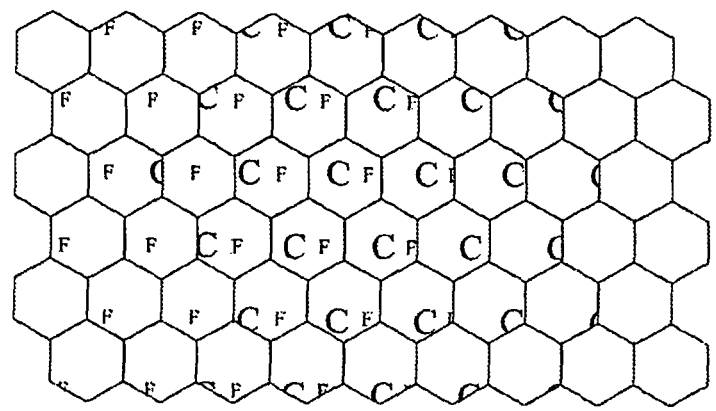
Fig. 3a
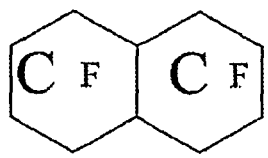
Fig. 3b
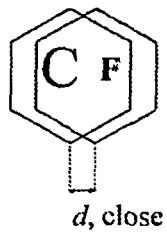 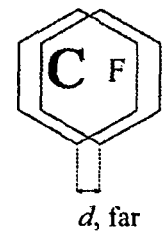
d, close     d, far
Fig. 3c     Fig. 3d

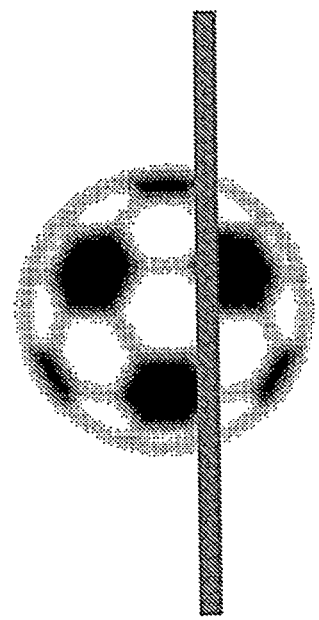
Fig. 5d
 
Fig. 5e  Fig. 5f

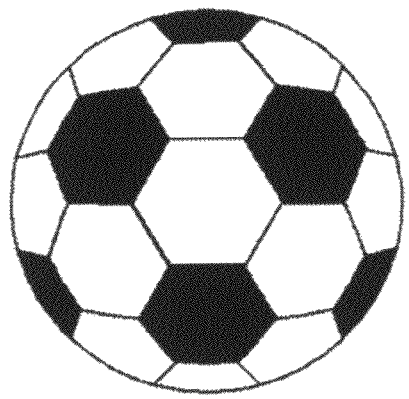
Fig. 5g
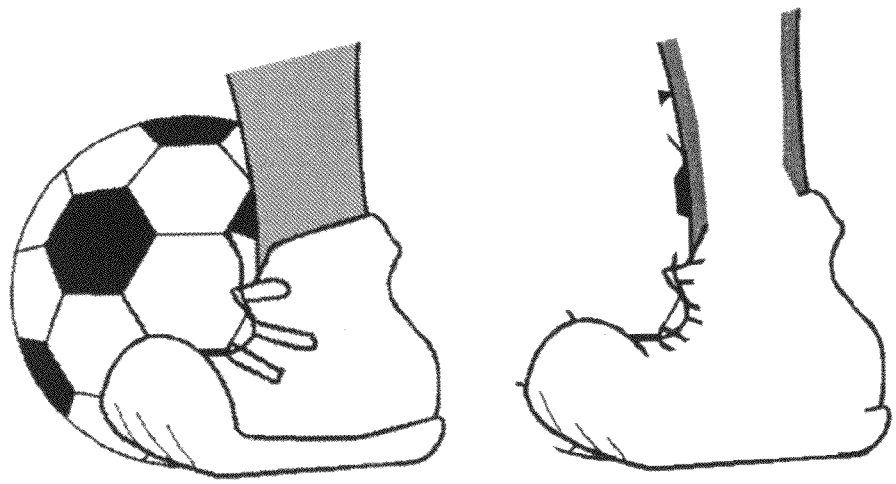
Fig. 6a
Fig. 6b

METHOD, GRAPHICAL USER INTERFACE, AND COMPUTER PROGRAM PRODUCT FOR PROCESSING OF A LIGHT FIELD IMAGE

CROSS-REFERENCES TO RELATED APPLICATIONS

This application is a 35 U.S.C. §371 U.S. national entry of International Application PCT/EP2011/057159 having an International filing date of May 4, 2011, the entire contents of which is incorporated herein by reference in its entirety.

TECHNICAL FIELD

This invention pertains in general to the field of light field imaging. More particularly the invention relates to a method, graphical user interface, and computer program product for processing of a light field image.

BACKGROUND

Light field imaging relates to images created using light field photography, wherein the light field data, i.e. angular information, position, and radiance of light rays from the photographed object or scene are accessible from the resulting light field image.

A standard 2D camera captures the light rays in two dimensions at plane f. The radiance and the position are recorded as pixel values and pixel position (coordinates x and y). However, the angles of the light rays are not recorded.

However, a light field camera records angular information as well as radiance and position. Having data describing light rays as vectors the rendering of the image may be processed in a way that is not possible with a standard 2D camera.

In essence a light field image comprises at least two subset images, wherein each subset image corresponds to a different viewpoint or direction of the imaged object or scene. Each subset image is captured by a separate lens. Hence, angular information is recorded in relations or differences among the subset images.

Various solutions to the problem of capturing lightfield data have been presented. A 3D camera having two lenses can be considered a simple lightfield camera as some angular data is preserved. Arrays of multiple cameras have been used. The plenoptic camera uses a single main lens and an array of micro lenses located in proximity to the image sensor. The plenoptic cameras can be divided into two categories; the focused and the unfocused type.

FIG. 1 schematically illustrates a known focused plenoptic camera, which utilizes uses an array of microlenses, Lm, to capture the light field image from an object r, wherein the object r if captured at the focal plane f would result in a sharp image (as for a standard 2D camera). The image sensor (not shown) is placed in the focal plane f2 of the microlens array Lm. The light paths for two micro lenses are shown. Both microlenses picture the same point of the object by using just a portion of the total cone of light representing that particular point. A typical focused plenoptic camera uses about 20-50 lenses to capture the light bundles from a single point. A typical design has several thousand microlenses. The depth of field of the individual subset images formed by the microlenses is very large as the focal length of the microlenses is very short compared with the main lens L.

An object that is moved closer or farther away from the camera will be imaged at a different focal plane f as can be seen in FIGS. 2a and 2b. Hence, the different angles of the light rays translate to a difference in position in the microlens images.

FIG. 3a illustrates a portion of a light field image, captured by a plenoptic camera, of the two objects "C" and "F" with "C" positioned closer to the camera than "F". Each hexagonal represents a subset image from a single microlens.

FIG. 3b shows two adjacent microlens subset images from the light field image of FIG. 3a. In FIG. 3c the two subset images has been superimposed in such a way that the letters C coincide. Note that the letter F is shifted sideways. This represents an image rendering with focus set at the distance of the letter C. In FIG. 3d the distance between the two images has been shifted to make the letter F sharp while the letter C is blurred. It can be seen from this example that a larger shift between the images (d) represents focus at closer distance from the camera. The out of focus portions in this example shows up as double strike letters. Normally when an image is rendered all microlens subset images are superimposed making out of focus objects appear smoothly blurred.

Another approach to rendering is to maintain the position of the individual microlens images but enlarging them until details in the desired focal plane coincide.

With current light field imaging techniques it is possible to focus, refocus, and change perspective. However an improved method, graphical user interface, and computer program product for processing of light field images allowing for new functionalities would be advantageous.

SUMMARY

According to an aspect, a method of processing a first light field image comprising light field data of a scene captured by a light field camera with known configuration is provided. The light field data comprises angular information of the captured scene. The method comprises rendering a first image from the light field data, corresponding to a first focal plane (f1) at which an object of the captured scene is in focus. Moreover the method comprises selecting the object in the rendered image. Furthermore, the method comprises applying a mask at least covering the pixels related to the edge of the selected object. The method further comprises deleting the pixels associated with the applied mask from the light field data, resulting in a first set of modified light field data.

In yet another aspect, a graphical user interface for connection to a processing apparatus, for processing light field data based on the input of a user, is provided. The graphical user interface is configured to display a rendered 2D image of a captured light field image, at a certain focal plane, in a display section thereof. The graphical user interface comprises a user input control, arranged to control the focal plane of a 2D representation of the light field image to be displayed as a 2D image to the user.

According to another aspect, a computer program product stored on a computer-readable medium comprising software code adapted to perform the steps of the method according to some embodiments when executed on a data-processing apparatus is provided.

An object is to provide a method of robust edge detection in a light field image comprising light field data.

Another object is to provide a method of edge detection in a light field image applicable even in cases where only an approximate position of the edge may be identified.

A further object is to provide a method allowing for more precise and reliable edge detection than is possible from traditional non light field 2D image data.

Yet another object is enable a simplified input user interface for selection of objects and/or edges based on the ability to refocus the light field image in post processing.

Another object is to provide a method for rendering a 2D image, wherein obstructing objects of limited size in the light field data has been removed.

Another object is to provide a copy/cut and paste functionality for light field images. In this way the image of an object of a light field image can be transferred from to another light field image while maintaining depth information of the transferred image.

BRIEF DESCRIPTION OF THE DRAWINGS

These and other aspects, features and advantages of which the invention is capable of will be apparent and elucidated from the following description of embodiments of the present invention, reference being made to the accompanying drawings, in which FIG. 1 schematically illustrates a focused plenoptic camera of prior art;

FIGS. 3a illustrates a portion of a light field image, captured by a plenoptic camera, of the two objects "C" and "F" with "C" positioned closer to the camera than "F";

FIG. 3b shows two adjacent microlens subset images from the light field image of FIG. 3a;

FIG. 3c illustrates the two subset images of FIG. 3b being superimposed in such a way that the letters C coincide;

FIG. 3d illustrates the two subset images of FIG. 3b being superimposed in such a way that the letters F coincide;

FIGS. 5a to 5g illustrate an example of object removal according to an embodiment;

FIGS. 6a to 6d illustrate an example of edge detection according to an embodiment;

DESCRIPTION OF EMBODIMENTS

The following description focuses on embodiments applicable to edge detection in light field images.

An idea is to provide a way for removal of an object obstructing the background in the captured light field image, and rendering a new image wherein the object is removed, and wherein the pixels of the deleted object are replaced with real background data, from behind the object, being accessible from the light field image.

Figure 1:
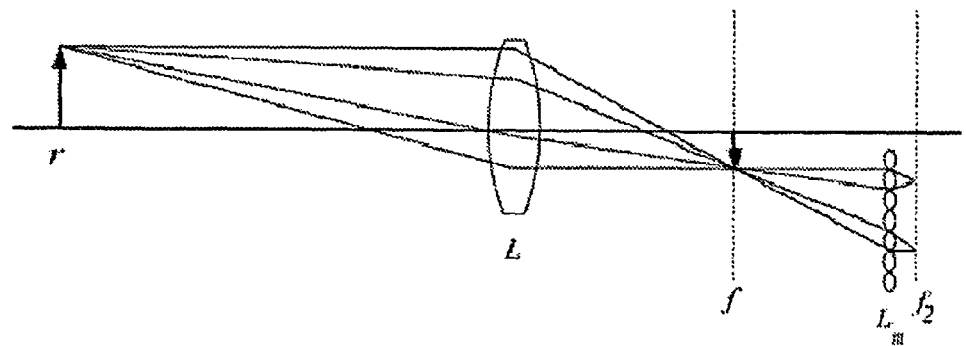
Figure 2A:
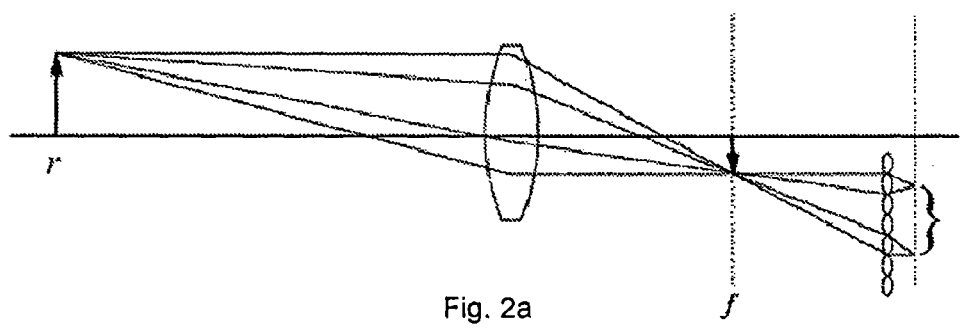
FIGS. 2a and 2b illustrate how the position of an imaged object, in relation to the plenoptic camera, affects the resulting light field image.
Figure 2B:
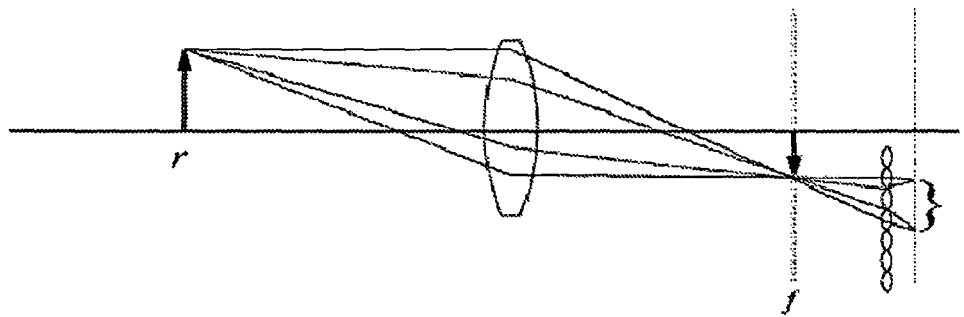
Figure 4A:
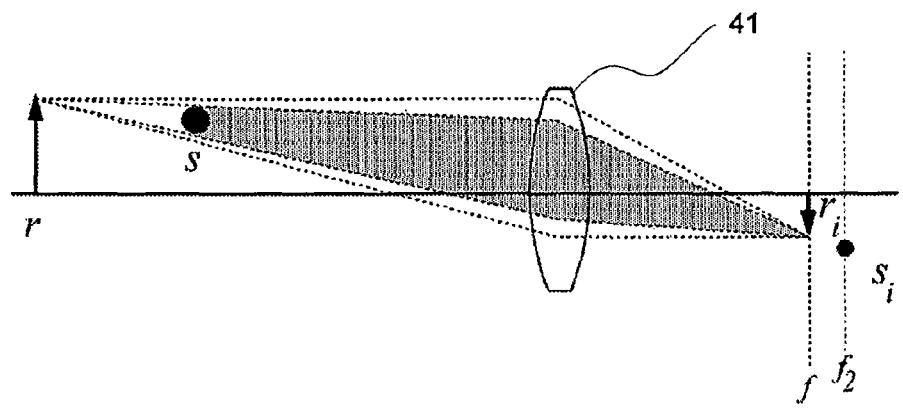
FIGS. 4a to 4c illustrate a principle of the invention.
Figure 4B:
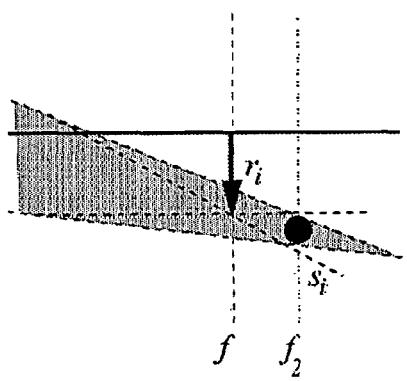
Figure 4C:
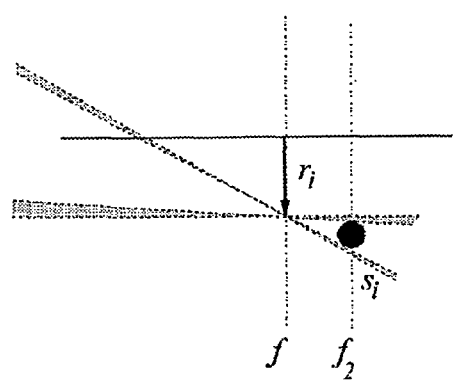

In order to facilitate the understanding of the present invention, FIGS. 4a to 4c aim to illustrate the foundation onto which the present invention is based.

FIG. 4 illustrates an optical setup of a simple camera comprising a convex main lens 41, and how the light rays travel from point from an object r, and an object s at least partly obstructing the light path from the point of object r. From FIG. 4a it may be observed that the optical path of an object s that obstructs a point of another object will still let some light rays from the point of object r pass unobscured. The shaded area of FIG. 4a represents the area where light from the point of object r is obscured by object s. The light from the edges of object s will however mix with the light rays representing the point of r. This makes object s to appear blurred.

Object s is imaged sharp at the focal plane $f_2$, as may be observed in FIG. 4b, wherein the optical paths of light rays forming image $s_i$ are shaded. It may further be observed that the light rays forming $s_i$ at $f_2$ are spread over some area of the image $r_i$ at f.

FIG. 4c corresponds to FIG. 4b, but wherein the light rays that are forming $r_i$ at f are shaded, instead. It may be observed that some of the light rays will hit $f_2$ at a position where there are no light rays associated with the image of object s.

The present inventors have realized that this means that object edges could be precisely identified in light field data while the edges might appear blurred in a two dimensional image. By considering that all the data representing object s is removed from the light field image one may observe from FIG. 4c that there are still light rays belonging to object r present. If a two dimensional image is rendered with focus set at $f_2$ there will be a portion of the image missing at the place where object s is expected. If, on the other hand, the image is rendered at focal plane f, there will be enough data to render the point of object r while object s is removed without leaving any gaps in the image. The present inventors have realized that this will be like looking behind objects. However, it should be appreciated that there is a limitation to the size of objects that may be removed successfully in such a manner.

For the understanding and completeness of the embodiments herein, it should be appreciated that focusing or refocusing, i.e. a way to render a 2D image from light field data at a certain focal plane, is known from the prior art. This focusing or refocusing at a certain focal plane may e.g. be performed as previously explained in regard to FIGS. 3a to 3d, for a plenoptic camera configuration, i.e. by bringing several subset images of the captured scene to a position where the object of interest, in each of the subset images, at the desired focal plane coincide. Depending on the exact type and/or configuration of light field camera that is used to capture the light field data, different known focusing or refocusing methods may be utilized. Furthermore, it is possible to perform focusing in the Fourier domain, see e.g. Ren Ng, Stanford University Computer Science Tech Report CSTR 2005-02.

The desired focal plan may also be chosen manually, e.g. by a user using a graphical user interface, in accordance with an embodiment described in greater detail below. Moreover, the focusing or refocusing at a certain focal plane could also be performed in an automated way, similarly to a conventional auto focus method.

Removal of an Object or Obstruction of a Light Field Image

A further example of the underlying principle of the invention may be observed in FIGS. 5a to 5d.

Figure 5A:
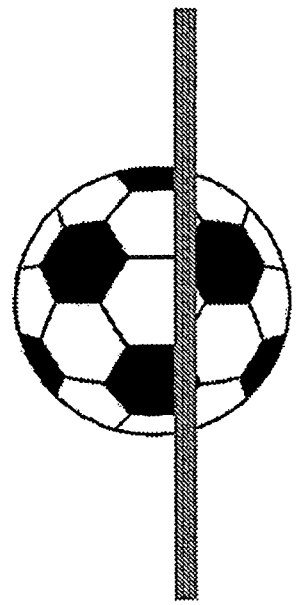

FIG. 5a illustrates a scene to be imaged by a light field camera. The scene comprises a stick being placed at some distance in front of a ball, thereby obstructing a part of the ball.

Figure 5B:
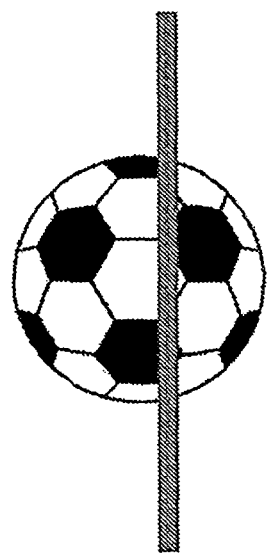
Figure 5C:
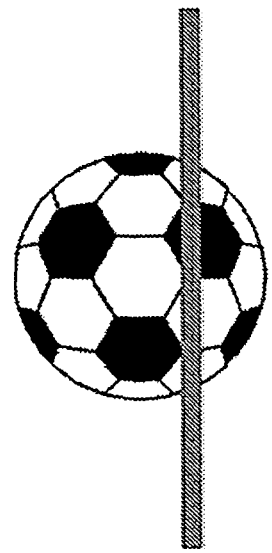

For simplicity FIGS. 5b and 5c illustrate two subset images from the corresponding captured light field image. Using a commonly known plenoptic camera there would have been numerous subset images showing partly the same area of the scene. An array camera would have several images each showing the entire scene. A slight parallax may be noticed as a difference in position of the stick compared with the ball between FIGS. 5b and 5c.

FIG. 5d illustrates a rendered image being the result of focusing at the stick, e.g. by bringing several subset images of the scene to a position where objects at the desired focal plane coincide as explained above, assuming that the captured light field image is composed of several subset images. Hence, in FIG. 5d the stick appears sharp while the ball is blurred.

Using commonly known image analysis techniques, it is now possible to remove the stick from the rendered image of FIG. 5d. This may be done in several ways. In a typical application a mask would be created where the pixels of the stick are marked. The mask is then used to identify the pixels in the light field data that should be excluded when rendering the image. When the image was rendered with the focal plane set at the stick each of the subset images was superimposed, i.e. each subset image had a certain displacement in relation to the others, as is indicated by displacement d in FIGS. 3b and 3c. The present inventors have realized that it is possible to utilize the exact same amount of displacement when applying the mask on the individual subset images. Accordingly, this may be thought of as doing the rendering backwards. Hence, by applying a mask together with knowledge of the displacement of each subset image in the rendered image, all pixel values of the individual subset images that represent the stick may be automatically identified and deleted. FIGS. 5e and 5f corresponds to FIGS. 5b, and 5c, respectively, wherein the stick has been deleted.

By rendering a new image, based upon the subset images in which the stick has been removed, with the focal plane set at the plane of the ball, i.e. focusing or refocusing on the ball, the resulting image will contain no sign of the stick without any missing details of the ball, as will be further explained in the following.

It may be observed from FIGS. 5e and 5f that superimposing the two subset images will result in a complete image of the ball, which is shown in FIG. 5g.

When the rendered image is focused on the ball, it is thus possible to fill in the deleted stick data of each subset image, with ball data from at least one of the other subset images. This assumes that there are no substantial depth differences in the details of those areas. If the image is then refocused, e.g. to the focal plane where the stick was previously in focus, the ball will be rendered blurred but without missing information.

Is should be appreciated that the making of the mask is not critical. It may be observed from FIG. 4c that there is a portion of light rays from object r that passes by object s. This means that the mask must cover the object that is intended to be removed but it can cover slightly more without blocking all the lights from the point of object r. Hence, one does not need to find the edges precisely as long as the edges are completely covered by the mask. This fact allows for another usage of the method according to some embodiments, namely precise edge detection.

Precise Edge Detection

Commonly known traditional edge detection algorithms analyses the gradients across an image. An edge is defined as a steep change in brightness values. A detected edge is not necessarily the boundaries of an object. Boundaries of objects are sometimes imaged slightly blurred in front of the background. Light rays that originate from the background are mixed with light rays from the object. It is then impossible to find a precise separation of the object and the background.

However, by utilizing the method according to some embodiments the edges of an object may be found with higher accuracy and definition.

Figure 6C:

A further example of the method according to an embodiment is illustrated with reference to FIGS. 6a to 6d. FIG. 6a illustrates a scene depicting a ball with a foot in front of it. In this example, the foot constitutes a fairly large object, in comparison to the background, whereby it may be not successfully removed, in the same manner as for the stick in the previous example with regard to FIG. 5, since the light field data does not comprise enough data from the background, located behind the foot, to allow for a good reconstruction. A 2D image is rendered from a light field image capturing the scene with focal plane set at the foot. An approximate position of the edge of the foot in the rendered 2D image may be determined either by user input or by an automated or manually assisted edge detection method, e.g. canny edge algorithm. The resulting area around the edge, determined by the known edge detection method to pertain to the approximate edge position, is shown in FIG. 6b.

A mask representing the area around the edge, i.e. based on FIG. 6b, may then be produced and applied to the light field data as previously described. Hence, the area around the edge, rather than the entire object as explained in conjunction with the stick of FIG. 5, may be removed from the light field data, in the same manner as in FIG. 5. Furthermore, the corresponding removed portions may be filled with relevant background image data, which in this case pertain to ball image data, e.g. by superimposing the relevant subset images using the same method described above and in FIGS. 5e, 5f and 5g. In this way image data originating from a location behind the area of the edge of the foot may be revealed. In other words the mask is used to delete the edge of the foot from the light field data based on a 2D image rendered at the focal plane of the ball. After applying the mask and deleting the area around the edge of the foot in the light field data, and filling the removed portions with relevant background data a new 2D image, FIG. 6c, may be rendered from the updated light field data having the focal plane set at the foot. It may be seen in FIG. 6c that the edge of the foot has been successfully removed and that background data originating from the ball is revealed at the corresponding positions.

Figure 6D:
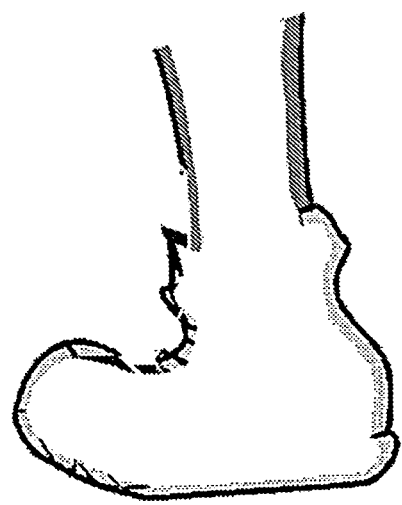

FIG. 6d illustrates a constructed 2D image, being the resulting 2D image from a comparison, e.g. utilizing any commonly known method such as subtracting, between a 2D image rendered from the original light field data having the focal plane set at the foot and the 2D image of FIG. 6c, being based on the updated light field data.

It may be observed that FIG. 6d, in contrast to FIG. 6b, illustrates an area around the edge where the true edge, i.e. the outer boundaries of the object, is depicted sharply without any visible artifacts originating from the background. Note that the outer boundaries of the image in FIG. 6d correspond precisely to the actual edge position of the foot, and is a result of utilizing, in the manner set out above, the approximate edge position as illustrated in FIG. 6b.

Object Copy/Cut and Paste Functionality

Copy/Cut and paste actions in traditional photo editing is very much like cutting out a part of a physical image (e.g. a photographic print) and pasting it on top of another physical image. This is frequently done as an artistic altering of the image content. The image can be moved in two dimensions and pasted at a desired position.

In a similar way it is possible to cut out light field data representing an object present in a light field image. Here the term "cutting" or "copying" refers to the extraction of data from a digital representation of a light field. This cut out or copied image may then be pasted into a second light field image. Here the term "pasting" refers to transferring the light field data representing the cut out section to the digital representation of the second light field image. Pasting in this context also assumes replacement of data. The cut out data that is pasted into the second light field image replaces data in the latter. Pasting a 2D-image means to cover or replace the under laying image in x and y coordinates. It should be appreciated that the term "pasting" when it comes to light field data means a replacement of the under laying data in 3 dimensions, e.g. x, y and z (depth) coordinates.

Accordingly, once the edge of the object is precisely identified, as illustrated in FIG. 6d, a further mask may be produced using the precisely identified edge as boundary. The light field data of the object is then extracted from the original light field image by using the mask to identify the data from each subset image to extract. It should be appreciated that the data defined by the further mask is here extracted rather than excluded or deleted by the mask mentioned in the examples of FIGS. 5 and 6 above.

Figure 7A:
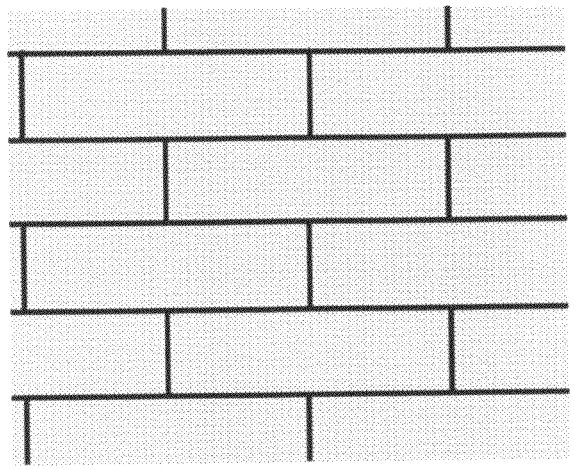
FIGS. 7a to 7b illustrate an example of cut/copy paste functionality according to an embodiment.
Figure 7B:
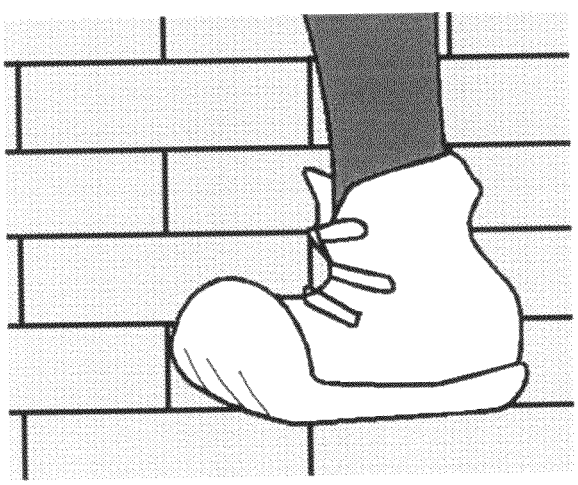

FIG. 7a illustrates a 2D image rendered from a second light field image of a scene comprising a brick wall. FIG. 7b shows a rendered image from the second light field image wherein the light field data of the foot from the first light field image is pasted using the further mask to determine what data from the first light field image to paste into the second light field image. The resulting light field image comprising merged data from the first and second light field image is now a representation of a light field where the pasted object (the foot) is present in front of the brick wall. Note that the resulting light field holds data that allows further manipulation possible with light field photography, e.g. refocusing.

Although the embodiments above, for simplicity, have been illustrated with focal planes perpendicular to the optical axis of the camera configuration, it should be appreciated that the present invention is not limited thereto. In fact, any desired focal plane may be utilized to render a corresponding 2D image. High precision edge detection is possible in 3D since the light field data comprises data in 3D. Moreover, it should be noted that it is possible to modify or manipulate the position of an object from a first light field image to be pasted in a second light field image in 3 dimensions.

Method

Figure 8:
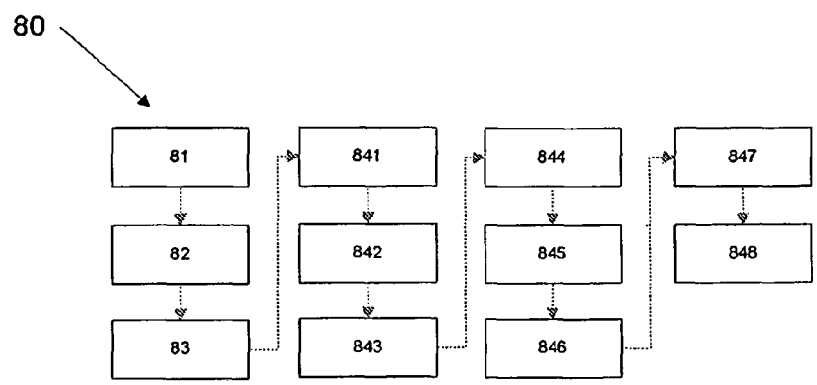
FIG. 8 illustrates a method according to an embodiment.

In an embodiment, according to FIG. 8, a method 80 for processing a light field image is provided. The light field image comprises light field data of a scene captured by a light field camera with known configuration. The light field data comprises angular information. Hence the light field data comprises image information not only in a two dimensional plane (x and y) but also in the third dimension, i.e. depth or distance from the camera position (z). The method comprises rendering 81 a first image from the light field data, corresponding to a first focal plane (f1) at which an object of the captured scene is in focus. The rendered image may be a 2D image being a representation of a certain plane or slice of a light field. The data representing this 2D image holds the x and y positions of pixel values at a defined z plane of the light field. The z plane is defined by the focus position when rendering the 2D image. The position of each pixel value of the 2D image is then known in all coordinates x, y and z.

The method further comprises selecting 82 the object or at least part thereof in the rendered image to be processed.

By identifying the object's corresponding pixel positions of the light field data and taking focus distance used for rendering into account it is possible to later manipulate vectors of light rays in the original light field data.

The method further comprises applying 83 a mask at least covering the pixels related to the edge of the selected object. The mask may thus either cover the entire object, such as in the example illustrated in respect of FIG. 5, when the object is to be completely removed, or e.g. cover the area around the edge of the object, as in the example illustrated in respect of FIG. 6.

The manipulation mentioned in the previous paragraph may be guided by usage of the mask or performed directly on data as the three dimensional position of the point to manipulate is calculated as described above. Positions and relative distances between points represented by pixel values may be expressed in absolute values or by any relative measure suitable for the system in use.

The method further comprises the step of deleting 841 the pixels associated with the applied mask from the light field data resulting in a first set of modified light field data.

Moreover, the method may further comprise the step of rendering 842 a second image from the first set of modified light field data, corresponding to a second focal plane (f2) different from that of the first focal plane (f1).

The method 80 may further comprise the step of filling 843 the pixels relating to the deleted pixels associated with the applied mask with data from the light field data being relevant for the corresponding pixel position using the remaining angular information of the first set of modified light field data, resulting in a second set of modified light field data.

The method may further comprise the step of rendering 844 a third image from the second set of modified light field data, corresponding to the first focal plane (f1), see e.g. FIG. 6c.

The method may further comprise the step of constructing 845 a fourth image based on the pixel difference or a comparison between the first image and the third image, see e.g. FIG. 6d.

Furthermore, the method may comprise the step of applying 846 a further mask based on the pixels of the fourth image, extracting 847, i.e. copying, the pixels encompassed by the further mask in the light field data, and pasting 848 the extracted pixels into a second light field image, see e.g. FIG. 7b.

The method according to some embodiments is applicable to light field data regardless of the used camera configuration and the used format of mathematical representation of the light field. The method for exactly defining edges as well as removing of obstructing objects may be applied to light field data of any kind regardless of the camera configuration.

Graphical User Interface

Figure 9:
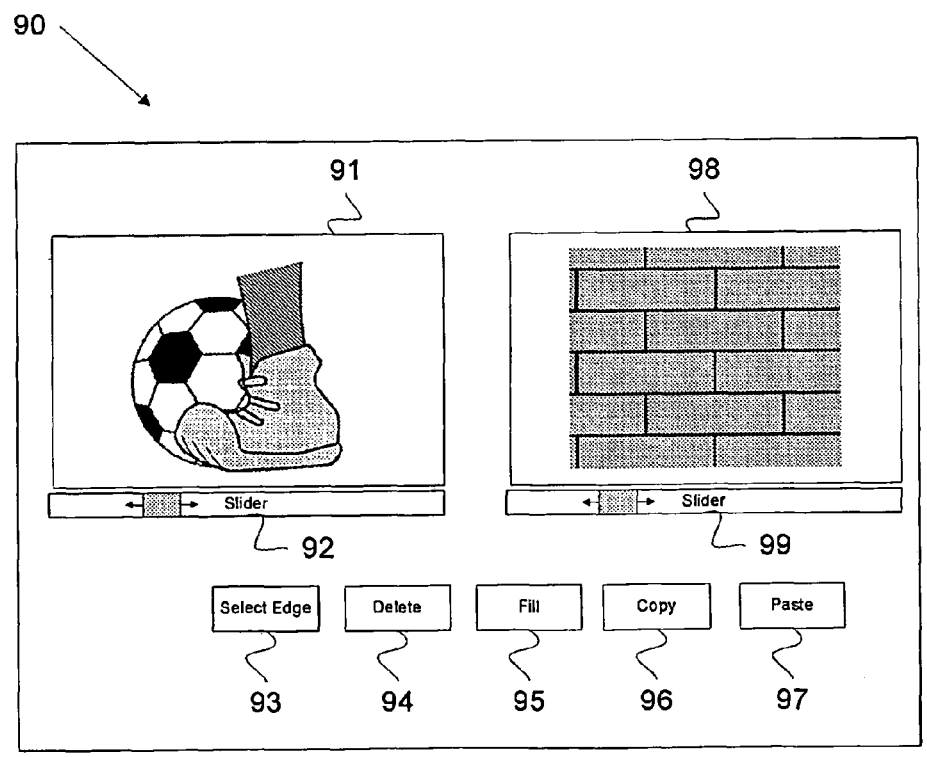
FIG. 9 illustrates a graphical user interface according to an embodiment.

In an embodiment, according to FIG. 9, a graphical user interface 90 is provided.

The graphical user interface is configured to interactively allow a user to utilize the method according to some embodiments.

The graphical user interface is connected to a processing apparatus, for processing light field data based on the input of a user. The graphical user interface is configured to display a rendered 2D image of a captured light field image, at a certain focal plane, in a display section 91. The user interface comprises a user input control 92, arranged to control the focal plane of a 2D representation of the light field image to be displayed as a 2D image to the user. Hence, by using the user input control 92 the user is able to focus/refocus on a certain object of the scene, in a user friendly way. The user input control may e.g. be a slider of a slider bar, wherein the position of the slider in the slider bar controls the focal plane of the automatically rendered corresponding 2D image. The slider may thus be moved to a position where the user is satisfied with the focusing of the rendered 2D image.

In a further embodiment, the graphical user interface 90 further comprises means 93 for selecting an object, or an approximate edge thereof, to be manipulated, e.g. deleted or copied, from the rendered 2D image. The means 93 for selecting may be another user input control, which allows the user to select, e.g. by a select button or pointing device, on the approximate edge. When the object or its approximate edge is selected the graphical user interface is configured to forward this information to the processing apparatus to initiate an edge detection algorithm.

In an embodiment, the graphical user interface 90 is further configured with means 94 for deleting, e.g. by a delete button, the object or its approximate edge identified by the edge detection from the light field data. By activating the means for deleting, the processing apparatus is configured to apply a mask at least covering the pixels related to the edge of the selected object, and delete the pixels associated with the applied mask from the light field data, resulting in a first set of modified light field data.

In an embodiment, the graphical user interface 90 is further configured with means 95 for filling, e.g. by a fill button, the pixels relating to the deleted object or edge thereof with data from the light field image being relevant for the corresponding pixel position. By activating the means for filling, the processing apparatus is configured to fill the pixels relating to the deleted pixels associated with the applied mask with data from the first set of modified light field data being relevant for the corresponding pixel position using the remaining angular information of the modified light field data, resulting in a second set of modified light field data.

In an embodiment, the graphical user interface 90 is further configured with means 96 to allow the user to copy the object identified by the edge detection, and means for pasting 97, e.g. by a pasting button, the object into another light field image optionally displayed in a further display section 98 having an input control 99 arranged to control the focal plane of a 2D representation of the light field image to be displayed as a 2D image. By activating the means for copying the object, the processing apparatus is configured to render a third image from the second set of modified light field data, corresponding to the first focal plane (f1), Subsequently a fourth image is constructed based on the pixel difference or a comparison between the first image and the third image. Then a further mask is applied based on the pixels of the fourth image, and finally the pixels encompassed by the further mask in the light field data, is extracted. By activating the means for pasting, the processing apparatus is configured to paste the extracted pixels into the second light image.

The invention may be implemented in any suitable form including hardware, software, firmware or any combination of these. However, preferably, the invention is implemented as a computer program product stored on a computer-readable medium comprising software code adapted to perform the steps of the method according to some or all of the embodiments mentioned above, when executed on a data processing apparatus and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims.

The invention claimed is:

1. A method of processing a first light field image comprising light field data of a scene captured by a light field camera with known configuration, wherein the light field data comprises angular information of the captured scene, the method comprising:
   rendering a first image from the light field data, corresponding to a first focal plane at which an object of the captured scene is in focus,
   selecting the object in the rendered image;
   applying a mask at least covering the pixels related to the edge of the selected object;
   deleting the pixels associated with the applied mask from the light field data, resulting in a first set of modified light field data;
   filling the pixels relating to the deleted pixels associated with the applied mask with data from the first set of modified light field data being relevant for the corresponding pixel position using the remaining angular information of the first set of modified light field data, resulting in a second set of modified light field data;
   rendering a further image from the second set of modified light field data, corresponding to the first focal plane;
   constructing a fourth image based on the pixel difference or a comparison between the first image and the further image;
   applying a further mask based on the pixels of the fourth image;
   extracting the pixels encompassed by the further mask in the light field data; and
   pasting the extracted pixels into a second light field image.

2. The method according to claim 1, wherein the data being relevant for the corresponding pixel position, is obtained from at least one of two subset images of the light field data, wherein each of the at least two subset images comprises different angular information of the captured scene.

3. A computer program product stored on a non-transitory computer-readable medium comprising software code adapted to perform the steps of the method according to claim 1.

* * * * *